US006640157B2

(12) United States Patent
Writt et al.

(10) Patent No.: US 6,640,157 B2
(45) Date of Patent: Oct. 28, 2003

(54) METHOD FOR OPERATING A MEDIA FEED MOTOR OF A PRINTER

(75) Inventors: John Thomas Writt, Lexington, KY (US); Barry Baxter Stout, Lexington, KY (US); Michael Anthony Marra, III, Lexington, KY (US); Randall David Mayo, Georgetonw, KY (US); Robert A. Bailey, Westminster, CO (US)

(73) Assignee: Lexmark International, Inc., Lexington, KY (US)

( * ) Notice: Subject to any disclaimer, the term of this patent is extended or adjusted under 35 U.S.C. 154(b) by 40 days.

(21) Appl. No.: 10/073,794

(22) Filed: Feb. 11, 2002

(65) Prior Publication Data

US 2003/0154000 A1 Aug. 14, 2003

(51) Int. Cl.[7] .................................................. G06F 7/00
(52) U.S. Cl. ........................ 700/213; 271/202; 271/270
(58) Field of Search ................................ 700/213, 219; 271/4.02, 4.03, 10.02, 10.03, 110, 111, 202, 265.01, 265.02, 265.03, 270; 400/624, 625, 545, 568

(56) References Cited

U.S. PATENT DOCUMENTS

| | | | | | |
|---|---|---|---|---|---|
| 3,940,127 | A | * | 2/1976 | Petusky et al. | 271/266 |
| 4,275,968 | A | | 6/1981 | Irwin | |
| 4,493,570 | A | | 1/1985 | Araki | |
| 4,511,242 | A | * | 4/1985 | Ashbee et al. | 399/395 |
| 4,533,269 | A | | 8/1985 | Pou et al. | |
| 4,538,933 | A | | 9/1985 | Imaizumi et al. | |
| 4,590,859 | A | | 5/1986 | Pou et al. | |
| 4,643,089 | A | * | 2/1987 | Salazar et al. | 101/91 |
| 4,734,868 | A | | 3/1988 | DeLacy | |
| 4,925,325 | A | | 5/1990 | Niikawa | |
| 4,968,165 | A | | 11/1990 | Karube et al. | |
| 5,071,273 | A | | 12/1991 | Kato | |
| 5,193,920 | A | | 3/1993 | Matsumoto et al. | |
| 5,209,589 | A | | 5/1993 | Bliss | |
| 5,251,891 | A | * | 10/1993 | Blaser et al. | 271/176 |
| 5,454,653 | A | | 10/1995 | Miwa | |
| 5,490,734 | A | | 2/1996 | Maruyama et al. | |
| 5,702,191 | A | | 12/1997 | Kakizaki et al. | |
| 5,816,716 | A | | 10/1998 | Sugiyama | |
| 6,168,333 | B1 | | 1/2001 | Merz et al. | |

* cited by examiner

*Primary Examiner*—Khoi H. Tran
(74) *Attorney, Agent, or Firm*—Thompson Hine LLP

(57) ABSTRACT

A method of the invention is for operating a media feed motor of a printer to perform a media feed move of a predetermined distance and includes steps a) through c). Step a) includes choosing a position-error scale factor for a media feed move that is within a range of distances. Step b) includes calculating a media-feed-motor drive signal which includes a position error contribution substantially equal to the product of the position-error scale factor and the difference between a desired final media position at the end of a media feed move and the actual media position. Step c) includes modifying the position error contribution in step b) to reduce its effect when the predetermined distance is greater than the maximum distance within the range but not when the predetermined distance is less than the maximum distance within the range.

26 Claims, 4 Drawing Sheets

METHOD FOR OPERATING A MEDIA FEED MOTOR OF A PRINTER

TECHNICAL FIELD

The present invention relates generally to printers, and more particularly to a method for operating a media feed motor of a printer.

BACKGROUND OF THE INVENTION

Printers include those printers which print on a paper sheet (or other type or form of media). Such printers have a paper feed mechanism to move the paper a predetermined distance such as a distance for the printer to print the next line of print. Such mechanisms include a paper feed motor. Conventional methods for operating a media feed motor of a printer to perform a media feed move of a predetermined distance include those which choose a media-feed-motor drive signal which includes a position error contribution substantially equal to the product of a scale factor and the difference between a desired final media position at the end of a media feed move and the actual media position. Other contributions to the media-feed-motor drive signal involve other control parameters and are known to the artisan. The scale factor and the other control parameters are different for different ranges of move distances. For example, the scale factor and the other control parameters for a media feed move between one and two units is different than the scale factor and the other control parameters for a media feed move between two and three units. In some control methods, the media-feed-motor drive signal includes a desired velocity error contribution of the difference between a desired media velocity and the actual media velocity. The chart of the desired media velocity versus actual media position has an acceleration portion, a steady-state portion, and a deceleration portion.

Sometimes, as is known to those skilled in the art, it is desirable to use the control parameters of a particular range of move distances for a media feed move which is greater than the maximum distance of that particular range. However, when a long media feed move needs to be made at a slower velocity than is typical for the long media feed move, using a velocity limit and the control parameters intended for a shorter move results in large velocity overshoot and poor accuracy in the move results. There is also a chance that the system will become unstable. What is needed is an improved method for operating a media feed motor of a printer.

SUMMARY OF THE INVENTION

A method of the invention is for operating a media feed motor of a printer to perform a media feed move of a predetermined distance and includes steps a) through c). Step a) includes choosing a position-error scale factor for a media feed move that is within a range of distances. Step b) includes calculating a media-feed-motor drive signal which includes a position error contribution substantially equal to the product of the position-error scale factor and the difference between a desired final media position at the end of a media feed move and the actual media position. Step c) includes modifying the position error contribution in step b) to reduce its effect when the predetermined distance is greater than the maximum distance within the range but not when the predetermined distance is less than the maximum distance within the range.

Several benefits and advantages are derived from the method of the invention. Applicants discovered that reducing the effect of the position error contribution of the media-feed-motor drive signal, when a longer media feed move was performed using control parameters for a shorter move, reduces velocity overshoot, improves accuracy in the move, and reduces the chance that the system would become unstable.

DETAILED DESCRIPTION

Figure 1:
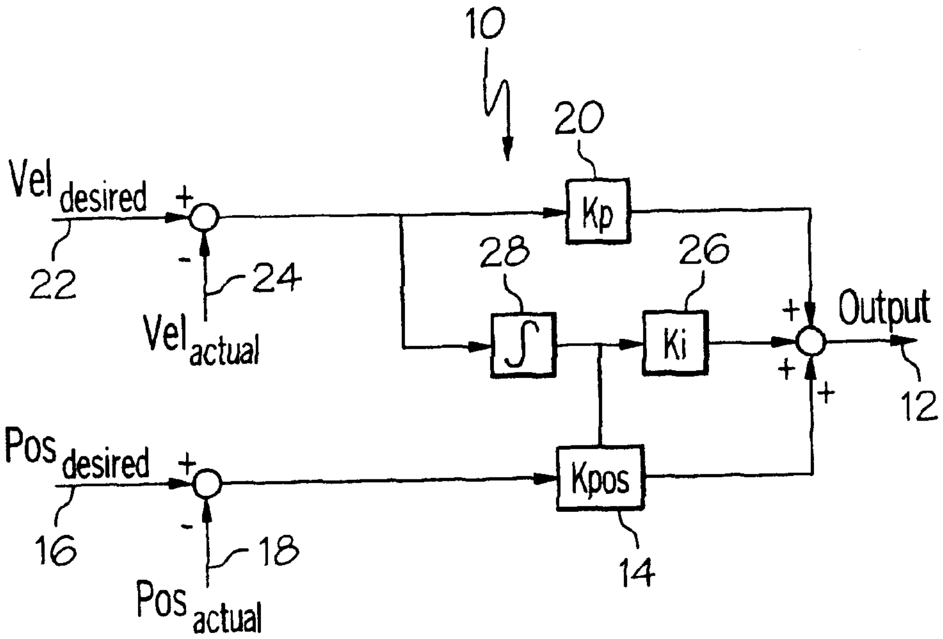
FIG. 1 is a block diagram of one embodiment of a media-feed-motor controller configured for a media feed move within a range of distances using control parameters for that range.

Referring to FIG. 1, one embodiment of a media-feed-motor controller 10, in which the method of the invention can be employed, includes a media-feed-motor drive signal 12 (labeled as "Output") which includes a position error contribution equal to the product of a position-error scale factor 14 (labeled as "Kpos") and the difference between a desired final media position 16 (labeled as "Pos desired") at the end of a media feed move and the actual media position 18 (labeled as "Pos actual). Such difference is referred to as the position error. The media-feedmotor drive signal 12 also includes a desired velocity contribution in the form of the product of a scale factor 20 (labeled as Kp) and the difference between the desired media velocity 22 (labeled as "Vel desired") and the actual media velocity 24 (labeled as "Vel actual"). The media-feed-motor drive signal 12 additionally includes a desired velocity contribution in the form of the product of a scale factor 26 (labeled as Ki) and the time integral 28 (labeled as "$\int$") of the difference between the desired media velocity 22 and the actual media velocity 24. Other embodiments of the media-feed-motor controller are left to the artisan.

Figure 2:
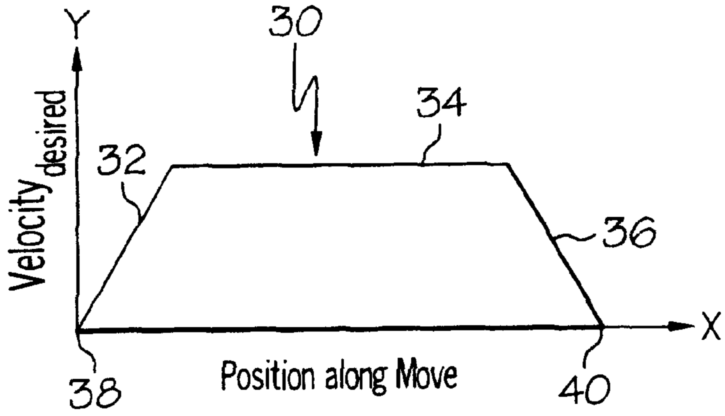
FIG. 2 is a chart of an example of desired media velocity versus actual media position useful to obtain the desired velocity input to FIG. 1.

A chart of one embodiment of desired velocity versus actual media position is shown in FIG. 2. The desired velocity 30 has an acceleration portion 32, a steady-state portion 34, and a deceleration portion 36. The start of the media feed move is shown at point 38 and the end of the media feed move is shown at point 40. The x axis is the actual media position and the y axis is the desired velocity.

Figure 3:
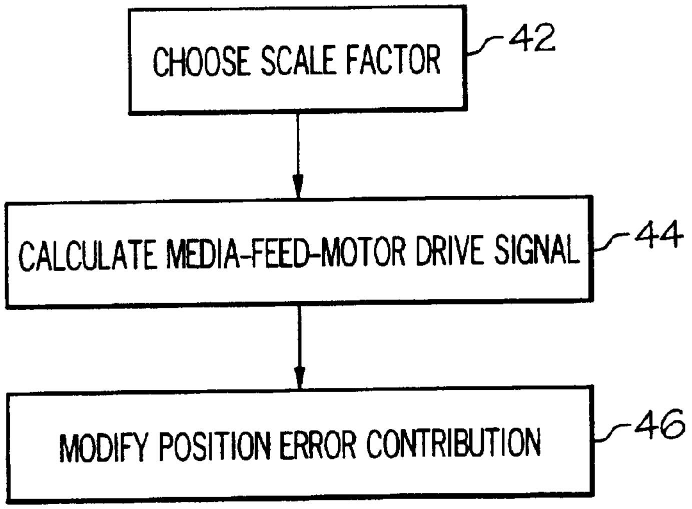
FIG. 3 is a block diagram of the steps of the invention.

A method of the invention, shown in block diagram form in FIG. 3, is for operating a media feed motor of a printer to perform a media feed move of a predetermined distance and includes steps a) through c). Step a) is labeled as "Choose Scale Factor" in block 42 of FIG. 3. Step a) includes choosing a position-error scale factor for a media feed move that is within a range of distances. Step b) is labeled as "Calculate Media-Feed-Motor Drive Signal" in block 44 of FIG. 3. Step b) includes calculating a media-feed-motor drive signal which includes a position error contribution substantially equal to the product of the position-error scale factor and the difference between a desired final media position at the end of a media feed move and the actual media position. Such difference is also known as the position error. Step c) is labeled as "Modify Position Error Contribution" in block 46 of FIG. 3. Step c) includes modifying the position error contribution in step b) to reduce its effect when the predetermined distance is greater than the maximum distance within the range but not when the predetermined distance is less than the maximum distance within the range. It is noted that printers are used, without limitation, for computer printing, for copying, for receiving and printing electronic transmissions, etc. The invention is not limited to a particular type of printer. It is also noted that the printer can print on any type of media including, without limitation, paper, transparencies, etc. and use any form of media including, without limitation, a sheet, a roll, etc. The invention is not limited to a particular type or form of media.

Figure 4:
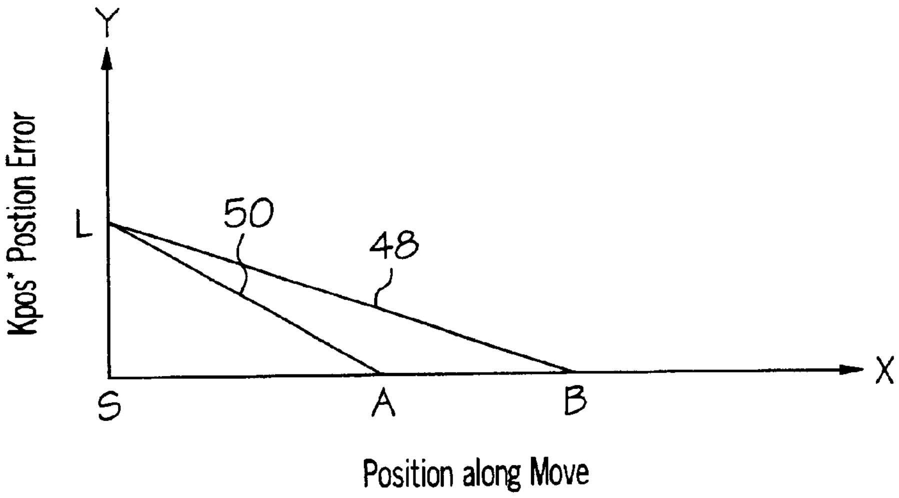
FIG. 4 is a graph of the modified position error contribution versus actual media position for a first example of the method of the invention. It can be used in FIG. 1 for a media feed move greater than the maximum distance of the range for which the control parameters have been chosen.

In a first example of the method of the invention, step c) modifies the position error contribution by setting a limit on the position error contribution at the start of a media feed move and by thereafter causing the position error contribution versus actual media position to decay throughout the media feed move. In one implementation of the first example, the limit is equal to the maximum position error contribution for the maximum distance within the range. In the same or a different implementation, step c) causes the position error contribution versus actual media position to linearly decay. Such implementations are graphically depicted in FIG. 4 which shows a modified position error contribution 48 for a long move (i.e., a move that is longer than the range used for the control parameters) and an unmodified position error contribution 50 for a normal move (i.e., a move that is within the range used for the control parameters). "L" indicates the limit, "S" indicates the start position of the media feed move, "A" indicates the end position of a normal media feed move, and "B" indicates the end position of a long media feed move. The x axis is the actual media position (labeled as "Position along Move") and the y axis is the position error contribution (labeled as Kpos * Position Error").

Figure 5:
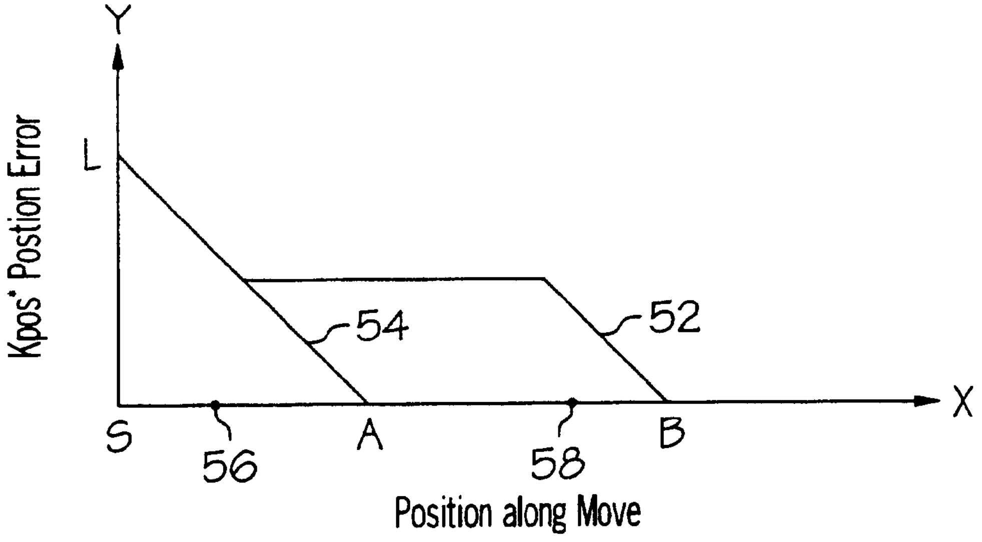
FIG. 5 is a graph of the modified position error contribution versus actual media position for a second example of the method of the invention. It can be used in FIG. 1 for a media feed move greater than the maximum distance of the range for which the control parameters have been chosen.

In a second example of the method, the media-feed-motor-drive signal includes a desired media feed velocity contribution, wherein a chart (such as that shown in FIG. 2) of the desired media feed velocity 30 versus actual media position includes an acceleration portion 32, a substantially steady-state portion 34, and a deceleration portion 36. In this example, step c) modifies the position error contribution by setting a limit on the position error contribution at the start of a media feed move, by thereafter causing the position error contribution versus actual media position to decay for actual media positions corresponding to the acceleration and deceleration portions of the chart, and by using a substantially constant value for the position error contribution versus actual media position for actual media positions corresponding to the steady-state portion of the chart. In one implementation of the second example, the limit is equal to the maximum position error contribution for the maximum distance within the range. In the same or a different implementation, step c) causes the position error contribution versus actual media position to linearly decay for actual media positions corresponding to the acceleration and deceleration portions of the chart. In the same or a different implementation, the acceleration portion of the chart is substantially linear and the deceleration portion of the chart is substantially linear. Such implementations are graphically depicted in FIGS. 2 and 5. FIG. 2 has been previously discussed. FIG. 5 shows a modified position error contribution 52 for a long move (i.e., a move that is longer than the range used for the control parameters) and an unmodified position error contribution 54 for a normal move (i.e., a move that is within the range used for the control parameters). "L" indicates the limit, "S" indicates the start position of the media feed move, "A" indicates the end position of a normal media feed move, and "B" indicates the end position of a long media feed move. The x axis is the actual media position (labeled as "Position along Move") and the y axis is the position error contribution (labeled as Kpos * Position Error"). Point 56 in FIG. 5 indicates the actual media position corresponding to the start of the steady state portion 34 of the chart of FIG. 2, and point 58 in FIG. 5 indicates the actual media position corresponding to the end of the steady state portion 34 of the chart of FIG. 2 for the long media feed move. It is noted that point 40 in FIG. 2 is the actual media position which corresponds to point "A" of FIG. 5 for a normal media feed move and which corresponds to point "B" for a long media feed move. It is also noted that the value of the steady state portion 34 of FIG. 2 is substantially the same for a normal or a long media feed move, the acceleration rate of FIG. 2 is substantially the same for a normal or a long media feed move, and the deceleration rate of FIG. 2 is substantially the same for a normal or a long media feed move.

Figure 6:
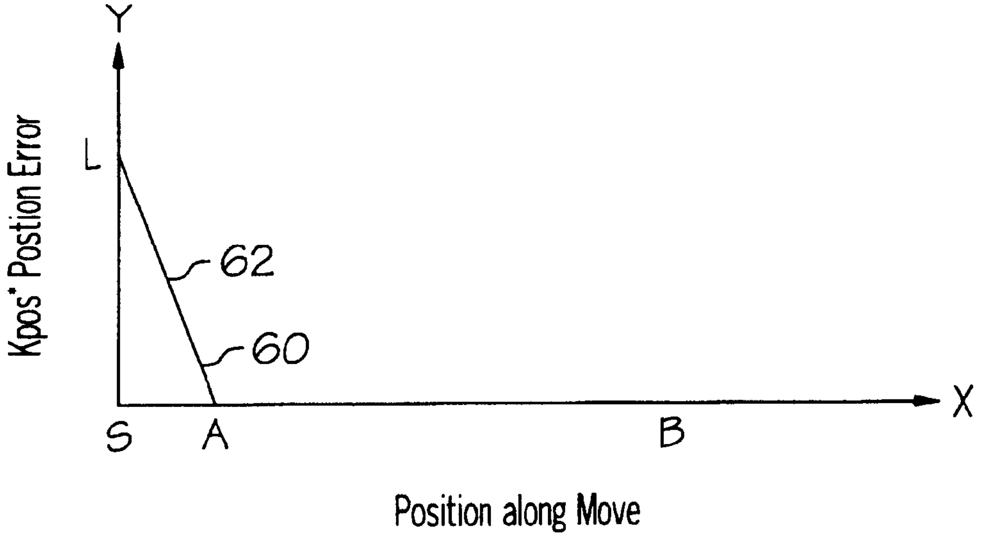
FIG. 6 is a graph of the modified position error contribution versus actual media position for a third example of the method of the invention. It can be used in FIG. 1 for a media feed move greater than the maximum distance of the range for which the control parameters have been chosen.

In a third example of the method, step c) modifies the position error contribution by setting a limit on the position error contribution at the start of a media feed move and by replacing the value of the desired final media position in the product of step b) with a replacement value less than the desired final media position. In one implementation of the third example, the limit is equal to the maximum position error contribution for the maximum distance within the range. In the same or a different implementation, the replacement value is equal to substantially the maximum distance within the range. Such implementations are graphically shown in FIG. 6 which shows a modified position error contribution 60 for a long move (i.e., a move that is longer than the range used for the control parameters) which is the same as an unmodified position error contribution 62 for a normal move (i.e., a move that is within the range used for the control parameters). "L" indicates the limit, "S" indicates the start position of the media feed move, "A" indicates the end position of a normal media feed move, and "B" indicates the end position of a long media feed move. In one application of this example, the desired velocity profile of FIG. 2 is changed to be just acceleration, and "A" in FIG. 6 and point 40 in FIG. 2 are chosen to correspond to the end of the acceleration period. The x axis is the actual media position (labeled as "Position along Move") and the y axis is the position error contribution (labeled as Kpos * Position Error").

Figure 7:
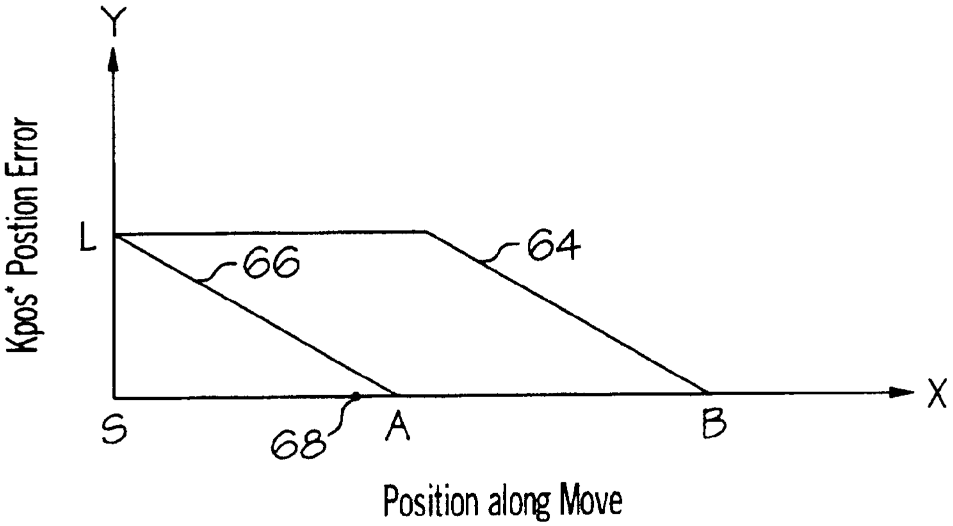
FIG. 7 is a graph of the modified position error contribution versus actual media position for a fourth example of the method of the invention. It can be used in FIG. 1 for a media feed move greater than the maximum distance of the range for which the control parameters have been chosen.

In a fourth example of the method, step c) modifies the position error contribution by setting a limit on the position error contribution at the start of the media feed move, by thereafter maintaining the limit until the actual media position reaches a predetermined media position, and by causing the position error contribution versus actual media position to decay when the actual media position exceeds the predetermined media position. In the fourth example, the predetermined media position is equal substantially to the media position corresponding to when the unlimited position error contribution first becomes less than the limit. In one implementation of the fourth example, the limit is equal to the maximum position error contribution for the maximum distance within the range. In the same or a different implementation, step c) causes the position error contribution versus actual media position to linearly decay when the actual media position exceeds the predetermined media position. Such implementations are graphically shown in FIG. 7 which shows a modified position error contribution 64 for a long move (i.e., a move that is longer than the range used for the control parameters) and an unmodified position error contribution 66 for a normal move (i.e., a move that is within the range used for the control parameters). "L" indicates the limit, "S" indicates the start position of the media feed move, "A" indicates the end position of a normal media feed move, and "B" indicates the end position of a long media feed move. The x axis is the actual media position (labeled as "Position along Move") and the y axis is the position error contribution (labeled as Kpos * Position Error"). Point 68 in FIG. 7 indicates the actual media position when the unlimited position error contribution first becomes less than the limit.

Figure 8:
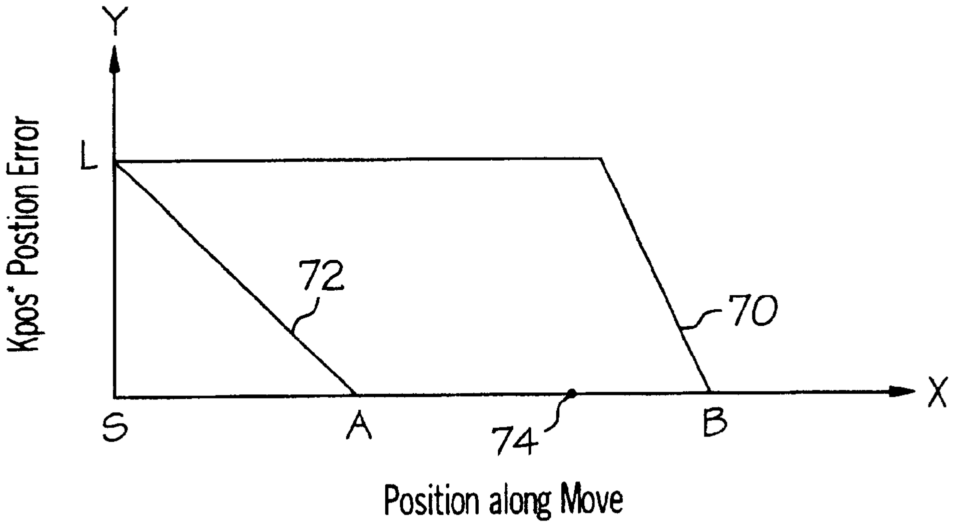
FIG. 8 is a graph of the modified position error contribution versus actual media position for a fifth example of the method of the invention. It can be used in FIG. 1 for a media feed move greater than the maximum distance of the range for which the control parameters have been chosen.

In a fifth example of the method, step c) modifies the position error contribution by setting a limit on the position error contribution at the start of the media feed move, by thereafter maintaining the limit until the actual media position reaches a predetermined media position, and by causing the position error contribution versus actual media position to decay when the actual media position exceeds the predetermined media position. In the fifth example, the media-feed-motor-drive signal includes a desired media feed velocity contribution, wherein a chart (such as that shown in FIG. 2) of the desired media feed velocity 30 versus actual media position includes an acceleration portion 32, a substantially steady-state portion 34, and a deceleration portion 36, wherein the predetermined media position is the media position which corresponds to the start of the deceleration portion of the chart. In one implementation of the fifth example, the limit is equal to the maximum position error contribution for the maximum distance within the range. In the same or a different implementation, step c) causes the position error contribution versus actual media position to linearly decay when the actual media position exceeds the predetermined media position. Such implementations are graphically depicted in FIGS. 2 and 8. FIG. 2 has been previously discussed. FIG. 8 shows a modified position error contribution 70 for a long move (i.e., a move that is longer than the range used for the control parameters) and an unmodified position error contribution 72 for a normal move (i.e., a move that is within the range used for the control parameters). "L" indicates the limit, "S" indicates the start position of the media feed move, "A" indicates the end position of a normal media feed move, and "B" indicates the end position of a long media feed move. The x axis is the actual media position (labeled as "Position along Move") and the y axis is the position error contribution (labeled as Kpos * Position Error"). Point 74 in FIG. 8 indicates the actual media position corresponding to the start of the deceleration portion 36 of the chart of FIG. 2. It is noted that point 40 in FIG. 2 is the actual media position which corresponds to point "A" of FIG. 5 for a normal media feed move and which corresponds to point "B" for a long media feed move. It is also noted that the value of the steady state portion 34 of FIG. 2 is substantially the same for a normal or a long media feed move, the acceleration rate of FIG. 2 is substantially the same for a normal or a long media feed move, and the deceleration rate of FIG. 2 is substantially the same for a normal or a long media feed move.

It is seen that examples 4 and 5 are narrow examples of a broader example of the method of the invention. In the broader example, step c) modifies the position error contribution by setting a limit on the position error contribution at the start of the media feed move, by thereafter maintaining the limit until the actual media position reaches a predetermined media position, and by causing the position error contribution versus actual media position to decay when the actual media position exceeds the predetermined media position. Predetermined media positions other than those described in examples 4 and 5 are left to the artisan. It is noted that the implementations of the fourth and fifth examples are equally applicable to the broader example. It is also noted that, in one application of the method of the invention, including in one application of all of the previously-described examples thereof, the position error is substantially zero at the end of a completed media feed move (unless such move is interrupted).

Several benefits and advantages are derived from the method of the invention. Applicants discovered that reducing the effect of the position error contribution of the media-feed-motor drive signal, when a longer media feed move was performed using control parameters for a shorter move, reduces velocity overshoot, improves accuracy in the move, and reduces the chance that the system would become unstable.

The foregoing description of a method and several examples thereof has been presented for purposes of illustration. It is not intended to be exhaustive or to limit the invention to the precise procedures and examples disclosed, and obviously many modifications and variations are possible in light of the above teaching. It is intended that the scope of the invention be defined by the claims appended hereto.

What is claimed is:

1. A method for operating a media feed motor of a printer to perform a media feed move of a predetermined distance comprising the steps of:

a) choosing a position-error scale factor for a media feed move that is within a range of distances;

b) calculating a media-feed-motor drive signal which includes a position error contribution substantially equal to the product of the position-error scale factor and the difference between a desired final media position at the end of a media feed move and the actual media position; and c) modifying the position error contribution in step b) to reduce its effect when the predetermined distance is greater than the maximum distance within the range but not when the predetermined distance is less than the maximum distance within the range.

2. The method of claim 1, wherein step c) modifies the position error contribution by setting a limit on the position error contribution at the start of a media feed move and by thereafter causing the position error contribution versus actual media position to decay throughout the media feed move.

3. The method of claim 2, wherein the limit is equal to the maximum position error contribution for the maximum distance within the range.

4. The method of claim 2, wherein step c) causes the position error contribution versus actual media position to linearly decay.

5. The method of claim 1, wherein the media-feed-motor-drive signal includes a desired media feed velocity contribution, wherein a chart of the desired media feed velocity versus actual media position includes an acceleration portion, a substantially steady-state portion, and a deceleration portion, and wherein step c) modifies the position error contribution by setting a limit on the position error contribution at the start of a media feed move, by thereafter causing the position error contribution versus actual media position to decay for actual media positions corresponding to the acceleration and deceleration portions of the chart, and by using a substantially constant value for the position error contribution versus actual media position for actual media positions corresponding to the steady-state portion of the chart.

6. The method of claim 5, wherein the limit is equal to the maximum position error contribution for the maximum distance within the range.

7. The method of claim 5, wherein step c) causes the position error contribution versus actual media position to linearly decay for actual media positions corresponding to the acceleration and deceleration portions of the chart.

8. The method of claim 7, wherein the acceleration portion of the chart is substantially linear and wherein the deceleration portion of the chart is substantially linear.

9. The method of claim 1, wherein step c) modifies the position error contribution by setting a limit on the position error contribution at the start of a media feed move and by replacing the value of the desired final media position in the product of step b) with a replacement value less than the desired final media position.

10. The method of claim 9, wherein the limit is equal to the maximum position error contribution for the maximum distance within the range.

11. The method of claim 10, wherein the replacement value is equal to substantially the maximum distance within the range.

12. The method of claim 1, wherein step c) modifies the position error contribution by setting a limit on the position error contribution at the start of the media feed move, by thereafter maintaining the limit until the actual media position reaches a predetermined media position, and by causing the position error contribution versus actual media position to decay when the actual media position exceeds the predetermined media position.

13. The method of claim 12, wherein the limit is equal to the maximum position error contribution for the maximum distance within the range.

14. The method of claim 12, wherein step c) causes the position error contribution versus actual media position to linearly decay when the actual media position exceeds the predetermined media position.

15. The method of claim 12, wherein the predetermined media position is equal substantially to the media position corresponding to when the unlimited position error contribution first becomes less than the limit.

16. The method of claim 15, wherein the limit is equal to the maximum position error contribution for the maximum distance within the range.

17. The method of claim 15, wherein step c) causes the position error contribution versus actual media position to linearly decay when the actual media position exceeds the predetermined media position.

18. The method of claim 12, wherein the media-feed-motor-drive signal includes a desired media feed velocity contribution, wherein a chart of the desired media feed velocity versus actual media position includes an acceleration portion, a substantially steady-state portion, and a deceleration portion, and wherein the predetermined media position is the media position which corresponds to the start of the deceleration portion of the chart.

19. The method of claim 18, wherein the limit is equal to the maximum position error contribution for the maximum distance within the range.

20. The method of claim 18, wherein step c) causes the position error contribution versus actual media position to linearly decay when the actual media position exceeds the predetermined media position.

21. A method for operating a media feed motor of a printer to perform a media feed move of a predetermined distance comprising the steps of:

a) choosing a position-error scale factor for a media feed move that is within a range of distances;

b) calculating a media-feed-motor drive signal which includes a position error contribution substantially equal to the product of the position-error scale factor and the difference between a desired final media position at the end of a media feed move and the actual media position; and c) modifying the position error contribution in step b) to reduce its effect when the predetermined distance is greater than the maximum distance within the range but not when the predetermined distance is less than the maximum distance within the range, wherein step c) modifies the position error contribution by setting a limit on the position error contribution at the start of a media feed move and by thereafter causing the position error contribution versus actual media position to decay throughout the media feed move.

22. A method for operating a media feed motor of a printer to perform a media feed move of a predetermined distance comprising the steps of:

a) choosing a position-error scale factor for a media feed move that is within a range of distances;

b) calculating a media-feed-motor drive signal which includes a position error contribution substantially equal to the product of the position-error scale factor and the difference between a desired final media position at the end of a media feed move and the actual media position; and c) modifying the position error contribution in step b) to reduce its effect when the predetermined distance is greater than the maximum distance within the range but not when the predetermined distance is less than the maximum distance within the range, wherein the media-feed-motor-drive signal includes a desired media feed velocity contribution, wherein a chart of the desired media feed velocity versus actual media position includes an acceleration portion, a substantially steady-state portion, and a deceleration portion, and wherein step c) modifies the position error contribution by setting a limit on the position error contribution at the start of a media feed move, by thereafter causing the position error contribution versus actual media position to decay for actual media positions corresponding to the acceleration and deceleration portions of the chart, and by using a substantially constant value for the position error contribution versus actual media position for actual media positions corresponding to the steady-state portion of the chart.

23. A method for operating a media feed motor of a printer to perform a media feed move of a predetermined distance comprising the steps of:

a) choosing a position-error scale factor for a media feed move that is within a range of distances;

b) calculating a media-feed-motor drive signal which includes a position error contribution substantially equal to the product of the position-error scale factor and the difference between a desired final media position at the end of a media feed move and the actual media position; and c) modifying the position error contribution in step b) to reduce its effect when the predetermined distance is greater than the maximum distance within the range but not when the predetermined distance is less than the maximum distance within the range, wherein step c) modifies the position error contribution by setting a limit on the position error contribution at the start of a media feed move and by replacing the value of the desired final media position in the product of step b) with a replacement value less than the desired final media position.

24. A method for operating a media feed motor of a printer to perform a media feed move of a predetermined distance comprising the steps of:

a) choosing a position-error scale factor for a media feed move that is within a range of distances;

b) calculating a media-feed-motor drive signal which includes a position error contribution substantially equal to the product of the position-error scale factor and the difference between a desired final media position at the end of a media feed move and the actual media position; and c) modifying the position error contribution in step b) to reduce its effect when the predetermined distance is greater than the maximum distance within the range but not when the predetermined distance is less than the maximum distance within the range, wherein step c) modifies the position error contribution by setting a limit on the position error contribution at the start of the media feed move, by thereafter maintaining the limit until the actual media position reaches a predetermined media position, and by causing the position error contribution versus actual media position to decay when the actual media position exceeds the predetermined media position.

25. A method for operating a media feed motor of a printer to perform a media feed move of a predetermined distance comprising the steps of:

a) choosing a position-error scale factor for a media feed move that is within a range of distances;

b) calculating a media-feed-motor drive signal which includes a position error contribution substantially equal to the product of the position-error scale factor and the difference between a desired final media position at the end of a media feed move and the actual media position; and c) modifying the position error contribution in step b) to reduce its effect when the predetermined distance is greater than the maximum distance within the range but not when the predetermined distance is less than the maximum distance within the range, wherein step c) modifies the position error contribution by setting a limit on the position error contribution at the start of the media feed move, by thereafter maintaining the limit until the actual media position reaches a predetermined media position, and by causing the position error contribution versus actual media position to decay when the actual media position exceeds the predetermined media position, and wherein the predetermined media position is equal substantially to the media position corresponding to when the unlimited position error contribution first becomes less than the limit.

26. A method for operating a media feed motor of a printer to perform a media feed move of a predetermined distance comprising the steps of:

a) choosing a position-error scale factor for a media feed move that is within a range of distances;

b) calculating a media-feed-motor drive signal which includes a position error contribution substantially equal to the product of the position-error scale factor and the difference between a desired final media position at the end of a media feed move and the actual media position; and c) modifying the position error contribution in step b) to reduce its effect when the predetermined distance is greater than the maximum distance within the range but not when the predetermined distance is less than the maximum distance within the range, wherein step c) modifies the position error contribution by setting a limit on the position error contribution at the start of the media feed move, by thereafter maintaining the limit until the actual media position reaches a predetermined media position, and by causing the position error contribution versus actual media position to decay when the actual media position exceeds the predetermined media position, wherein the media-feed-motor-drive signal includes a desired media feed velocity contribution, wherein a chart of the desired media feed velocity versus actual media position includes an acceleration portion, a substantially steady-state portion, and a deceleration portion, and wherein the predetermined media position is the media position which corresponds to the start of the deceleration portion of the chart.

* * * * *